United States Patent
Pan et al.

(10) Patent No.: US 11,477,847 B2
(45) Date of Patent: Oct. 18, 2022

(54) PREDICTIVE LOCATION SELECTION OPTIMIZATION SYSTEM

(71) Applicant: Uber Technologies, Inc., San Francisco, CA (US)

(72) Inventors: Pan Pan, San Francisco, CA (US); Jon Petersen, San Francisco, CA (US); Kevin Su, San Francisco, CA (US); Ronak Trivedi, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 17/219,312

(22) Filed: Mar. 31, 2021

(65) Prior Publication Data

US 2021/0251041 A1 Aug. 12, 2021

Related U.S. Application Data

(63) Continuation of application No. 16/890,162, filed on Jun. 2, 2020, now Pat. No. 11,006,479, which is a
(Continued)

(51) Int. Cl.
G06F 15/16 (2006.01)
H04W 84/02 (2009.01)
(Continued)

(52) U.S. Cl.
CPC ........... *H04W 84/02* (2013.01); *H04W 48/18* (2013.01); *H04W 88/06* (2013.01); *H04W 92/02* (2013.01);
(Continued)

(58) Field of Classification Search
CPC ..... H04W 84/02; H04W 88/06; H04W 92/02; H04W 48/18; H04W 64/00; H04W 24/02; H04M 2242/30
See application file for complete search history.

(56) References Cited

U.S. PATENT DOCUMENTS 9,158,414 B1 10/2015 Gluzberg
2007/0150375 A1 6/2007 Yang
(Continued)

FOREIGN PATENT DOCUMENTS

CN 103617450 3/2014
JP 2010-208195 8/1998
(Continued)

OTHER PUBLICATIONS

"How Much Does Lyft Cost?", https:/ techboomers.com/t/lyft-cost-lyft- pricing Published on Sep. 19, 2016.
(Continued)

*Primary Examiner* — Richard G Keehn
(74) *Attorney, Agent, or Firm* — Mahamedi IP Law LLP

(57) ABSTRACT

A system can receive, over one or more networks, location data from a computing device of a requesting user, where the location data indicates a current position of the requesting user. The system can repeatedly determine, based at least in part on location data corresponding to a directional heading of a proximate transport provider in relation to the current position of the requesting user, an optimal rendezvous location for the requesting user prior to the requesting user transmitting a service request to the network computer system. The system may then transmit, over the one or more networks, data corresponding to the optimal rendezvous location to the computing device of the requesting user.

15 Claims, 7 Drawing Sheets

Related U.S. Application Data continuation of application No. 15/600,570, filed on May 19, 2017, now Pat. No. 10,701,759.

(51) Int. Cl.
  *H04W 48/18* (2009.01)
  *H04W 88/06* (2009.01)
  *H04W 92/02* (2009.01)
  H04W 64/00 (2009.01)
  H04W 24/02 (2009.01)

(52) U.S. Cl.
  CPC ........ *H04M 2242/30* (2013.01); *H04W 24/02* (2013.01); *H04W 64/00* (2013.01)

(56) References Cited

U.S. PATENT DOCUMENTS

| | | | |
|---|---|---|---|
| 2008/0162304 A1 | 7/2008 | Ourega | |
| 2008/0277183 A1 | 11/2008 | Huang | |
| 2009/0054081 A1* | 2/2009 | Tsai | H04W 4/029 455/456.1 |
| 2010/0116881 A1 | 5/2010 | Flood | |
| 2011/0251952 A1 | 10/2011 | Kelly | |
| 2011/0301985 A1 | 12/2011 | Camp | |
| 2013/0132140 A1 | 5/2013 | Amin | |
| 2013/0132246 A1 | 5/2013 | Amin | |
| 2014/0011522 A1 | 1/2014 | Lin | |
| 2014/0129135 A1 | 5/2014 | Holden | |
| 2015/0002319 A1* | 1/2015 | Jin | H04W 4/029 340/989 |
| 2015/0067878 A1 | 3/2015 | Steelberg | |
| 2015/0143275 A1 | 5/2015 | Lee | |
| 2015/0219464 A1 | 8/2015 | Beaurepaire | |
| 2015/0317568 A1 | 11/2015 | Grasso | |
| 2016/0034828 A1* | 2/2016 | Sarawgi | G06Q 10/00 705/5 |
| 2016/0267495 A1 | 9/2016 | Bernard | |
| 2016/0292596 A1 | 10/2016 | Gaitan | |
| 2016/0300186 A1 | 10/2016 | Scharaswak | |
| 2017/0011324 A1 | 1/2017 | Truong | |
| 2017/0083672 A1 | 3/2017 | Juneau | |
| 2017/0098377 A1* | 4/2017 | Marco | G01C 21/34 |
| 2017/0132540 A1* | 5/2017 | Haparnas | G06Q 10/06311 |
| 2017/0213208 A1 | 7/2017 | Downs | |
| 2017/0228837 A1 | 8/2017 | Porter | |
| 2017/0263141 A1 | 9/2017 | Possick | |
| 2017/0300848 A1 | 10/2017 | Shoval | |
| 2018/0189917 A1 | 7/2018 | Shen | |
| 2018/0209803 A1 | 7/2018 | Rakah | |
| 2018/0240128 A1 | 8/2018 | Lu | |
| 2018/0338298 A1 | 11/2018 | Pan | |
| 2019/0172065 A1 | 6/2019 | Hosny | |
| 2020/0305227 A1 | 9/2020 | Pan | |
| 2021/0209520 A1 | 7/2021 | Sarawgi | |

FOREIGN PATENT DOCUMENTS

| | | |
|---|---|---|
| JP | 3934985 | 6/2007 |
| JP | 2012-73995 | 4/2012 |
| JP | 2004-073639 | 5/2015 |
| WO | WO-2014106617 | 7/2014 |

OTHER PUBLICATIONS

"Uber's internal charts show how its driver-rating system actually works", https:/www.businessinsider.com.au/ leaked-charts-show-how-ubers-driver- rating-system-works-2015-2 Published on Feb. 12, 2015.

Mark H. Walker, "Microsoft Office Visio 2003 Official Manual", Initial Pressing, Nikkei BP Soft Press, Apr. 4, 2005, First Edition, pp. 423-425.

* cited by examiner

PREDICTIVE LOCATION SELECTION OPTIMIZATION SYSTEM

CROSS-REFERENCE TO RELATED APPLICATION

This application is a continuation of U.S. patent application Ser. No. 16/890,162, filed on Jun. 2, 2020; which is a continuation of U.S. patent application Ser. No. 15/600,570, filed on May 19, 2017, now U.S. Pat. No. 10,701,759; the aforementioned priority applications being hereby incorporated by reference in their entireties.

BACKGROUND

A network computer system can enable users to request and receive various services through applications executed on mobile computing devices. The network computer system typically selects a service provider to fulfill requests based on user-specific data from the request, such as the location of the user, and provider-specific data, such as the locations of nearby providers. These service providers can interact with the network computer system to accept or decline service requests, receive data about the requesting users, and set various status modes such as whether the provider is offline or online and available to fulfill requests.

DETAILED DESCRIPTION

Figure 1:
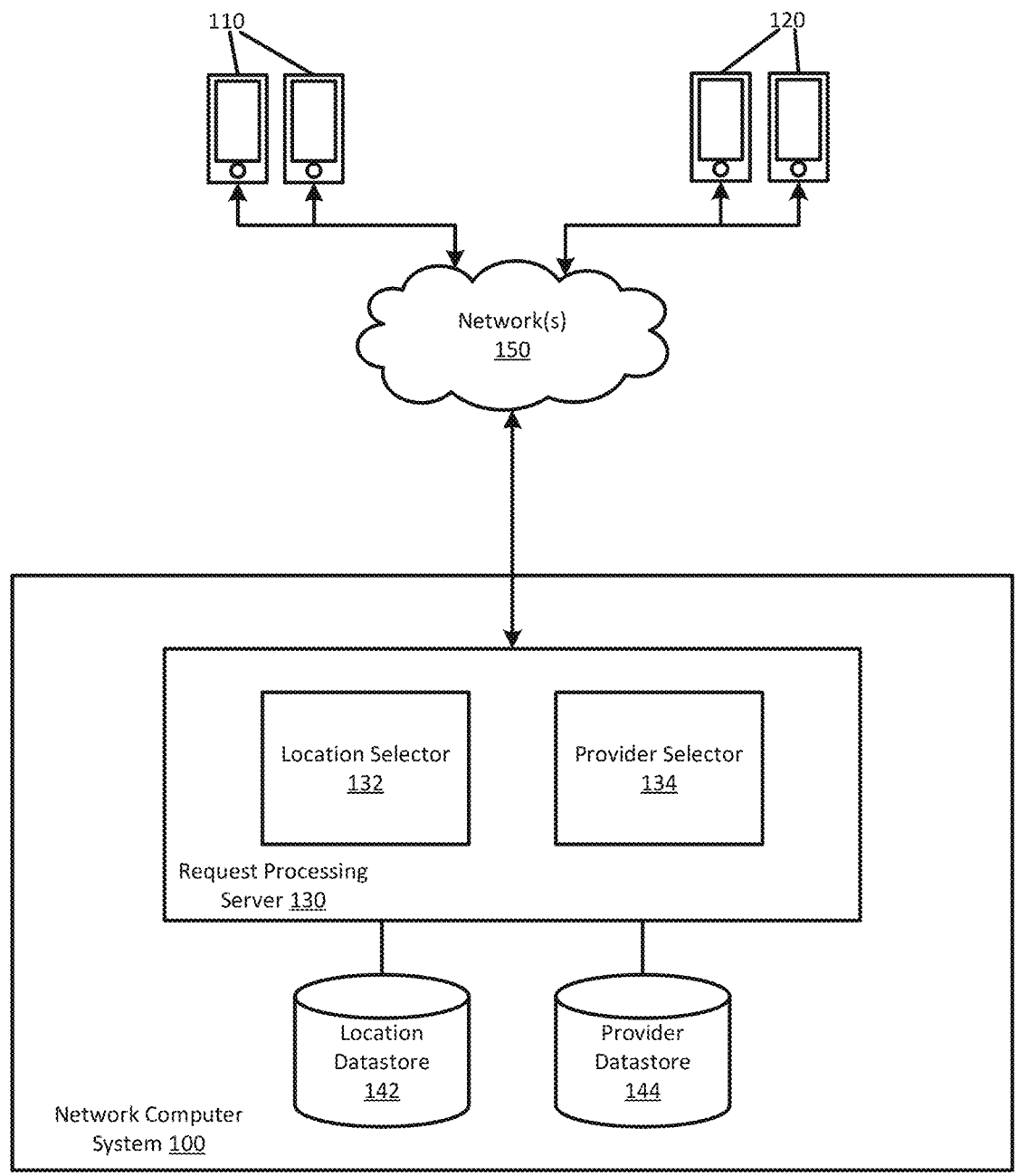
FIG. 1 is a block diagram illustrating an example network computer system in communication with service requester devices and service provider devices, in accordance with examples described herein.

A network computer system is provided herein that manages an on-demand network-based service linking available service providers with service requesters throughout a given region (e.g., a metroplex such as the San Francisco Bay Area). According to examples, the network computer system can receive service requests for on-demand services (e.g., transport service or delivery service) from requesting users (e.g., riders) via a designated service requester application executing on the users' mobile computing devices. Based, at least in part, on the user's position, the network computer system can identify a number of proximate available service providers (e.g., drivers) and transmit a service invitation message to one or more service provider devices of the proximate available service providers to fulfill the service request (e.g., provide or perform the corresponding service). In many examples, the service providers can either accept or decline the invitation based on, among other reasons, a service location or service destination being impractical for the service provider.

In some systems, users can manually choose the service location or use their current location as the service location. This manual choice can often result in locations that are unsuited for actual road conditions, which may delay pick up time or total trip time. Users may also need to contact the provider to adjust the service location, for example to cross the street, or because the initially-proposed service location is suboptimal or not suitable for the pickup. In addition, the manual selection of a service location can add an additional step in the user's request for service.

In some aspects, the network computer system can select the service location based on the position of the user and proximate available service providers. The network computer system can also select the service location prior to receiving a service request from the user. In one example, in response to the user inputting a destination for a transportation service, the network computer system determines the specific service location or a more general service area (e.g., an intersection of roads), which may be where the user has the highest probability of matching with a service provider, or the highest match quality, upon submitting a service request to the network computer system. In another example, the network computer system can determine the highest match quality between the service provider and multiple users.

In conventional service requester applications used with on-demand service systems, once a user makes a request for service (e.g., the request is sent to the network computer system), the user waits at a "requesting" screen while the network computer system performs a selection operation to identify a service provider from one or more candidate service providers. The requesting screen typically transitions to a "service in progress" screen with the service provider's specific information once that service provider has accepted the invitation to provide the service.

In some examples, to avoid having the user wait at a "requesting" screen while the network computer system determines a service location and a corresponding service provider, the network computer system can preselect a service location for the user, prior to the user making the request for service, where the user is likely able to rendezvous with a service provider. The network computer system can also transmit directions to the service location to the user's computing device. To prevent the preselected service location from going stale, the user's computing device can request an updated service location from the network computer system at regular intervals (e.g., 30 seconds).

In one aspect, the network computer system can select the service location based on a best match location or best match service provider upon receiving the location of the user or receiving a destination from the user. However, if the user delays making a request for service, even if only for ten seconds, the preselected best match may no longer be the best match once the user makes the request. For example, the best service provider may be traveling quickly or in the opposite direction from the user, thus making that service provider a poor choice, or even infeasible, after ten seconds. In high traffic cities with one-way streets and avenues, it can take a provider a significant amount of time to loop back around to a pickup location behind the service provider's current location. This can result in user cancellations, provider cancellations, low efficiency, and overall poor service.

Therefore, rather than selecting the service location based on a current best match provider or location, the network computer system can take into account inherent delays in the system and the process of a user submitting a service request. As such, the network computer system can select a service location or area where the user has the highest probability of matching, or highest expected match quality, with a service provider at a future time (i.e., a time when the user is predicted to submit a service request to the network computer system).

According to examples described herein, the network computer system receives data corresponding to the position of the user from an application running on a computing device of the user. The network computer system locates service providers based on the position of the user (e.g., service providers within a threshold distance or travel time from the position of the user). In other examples, the network computer system locates the service providers in response to receiving a destination for a transportation service from the user. In addition, the network computer system selects predefined service areas, such as sets of corners at intersections, within a threshold distance or travel time from the position of the user.

In some aspects, the network computer system determines a probability score for at least some of the predefined service areas based on predicted availability of the service providers to provide service to the user. The predicted availability is determined based on a time when the user is expected to request service. In some examples, this time is predetermined, such as fifteen seconds from the current time. In other examples, the network computer system can predict when the user is expected to request service, which can be based on historical data for the user and other users.

Determining the predicted availability of a given provider within a given predefined service area is based on an aggregate of factors. Among others, these factors can include travel speed for the given provider, distance of the given provider to the given predefined service area, a directional heading of the given provider, a service destination specified by the user, a deviation between the directional heading for the given provider and a heading towards the service destination, number of people in a vehicle driven by the given provider, a prediction that the given provider receives another service request before the user requests service, and historical availability data for the given predefined service area.

In some aspects, the network computer system selects an optimal one of the predefined service areas based at least on the probability scores, and transmits, to the computing device of the user, data corresponding to the optimal service area to be displayed on the computing device in response to the user submitting the request for service. The data can include a map location for the optimal service area and walking directions from the position of the user to the optimal service area.

In some aspects, the network computer system receives data corresponding to the request for service from the computing device of the user and selects an available provider at that time to provide service for the user at a point within the selected service area. For example, the selected service area can be an intersection and the point within the selected service area is one of the corners of the intersection.

Upon making the request, the user's computing device can display the directions to the service location while the network computer system identifies a service provider from the candidate service providers to provide service at the preselected service location.

In some examples, in selecting a service provider to fulfill a given service request, the network computer system can identify candidate service providers to fulfill the service request within the service area (e.g., at one of the corners of the intersection) that was identified and transmitted to the user prior to the service request. For example, the network computer system can determine a geo-fence (e.g., a region specified by three or more location points or a defined area, such as a hexagon from an array of hexagons) surrounding the service area (or a geo-fence defined by a radius away from the service area), identify a set of candidate service providers (e.g., twenty or thirty service providers within the geo-fence), and select a service provider (e.g., the closest service provider to the service area, service provider with the shortest estimated travel time to the service area, service provider traveling to a location within a specified distance or specified travel time to the destination location, etc.) from the set of candidate service providers to fulfill the service request. According to examples provided herein, the network computer system can compile historical data for individual service requesters with regard to the network-based service. Thus, the network computer system can manage a profile for each user indicating routine start and/or end locations (or regions), and/or routine routes (e.g., for a transportation service from home to work and/or vice versa) and preferred service types (e.g., transportation, delivery, mailing, etc.). In some examples, the network computer system can further synchronize with a service requester device to, for example, identify the service requester's contacts, the service requester's schedule and appointments, travel plans (e.g., a scheduled trip), and the like.

After selecting an available provider and/or receiving confirmation from the selected provider, the network computer system can transmit data corresponding to the selected provider and the point within the selected service area to the computing device of the user to be displayed.

Among other benefits, the examples described herein achieve a technical effect of providing walking directions to a user after the user submits a service request, without delaying to select a service provider or determine an exact service location.

As provided herein, the terms "user" and "service requester" are used throughout this application interchangeably to describe a person or group of people who utilize a service requester application on a computing device to request, over one or more networks, on-demand services from a network computer system. The term "service provider" is used to describe a person utilizing a service provider application on a computing device to provide on-demand services to the service requesters.

One or more aspects described herein provide that methods, techniques, and actions performed by a computing device are performed programmatically or as a computer-implemented method. Programmatically means through the use of code or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs, or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried out or executed. In particular, the numerous machines shown in some examples include processors and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network-enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of interconnected logic gates. Such circuits are typically designed using a hardware description language (HDL), such as Verilog or VHDL. These languages contain instructions that ultimately define the layout of the circuit. However, once the circuit is fabricated, there are no instructions, and the processing is performed by interconnected logic gates.

System Overview

FIG. 1 is a block diagram illustrating an example network computer system in communication with service requester and service provider devices, in accordance with examples described herein. The network computer system 100 can implement or manage a network service (e.g., an on-demand transport or delivery arrangement service) that connects service requesters with service providers that are available to fulfill the service requests at a service area or location.

A request processing server 130 managing the network service can enable service requesters to submit requests over one or more networks 150 through a service requester application executing on the service requester devices 110. In some aspects, a location selector 132 provided with the request processing server 130 can determine a suitable service location based on the position of the user and proximate available service providers. The location selector 132 can also select the service location prior to receiving a service request from the user. In one aspect, in response to the user inputting a destination for a transportation service, the location selector 132 determines the specific service location or a more general service area (e.g., an intersection of roads), which may be where the user has the highest probability of matching with a service provider upon submitting a service request to the request processing server 130.

Upon receiving service requests, a provider selector 134 of the request processing server 130 processes and transmits the requests to appropriate service providers by way of a service provider application executing on the service provider devices 120. As used herein, a service requester device 110 and a service provider device 120 can comprise computing devices with functionality to execute designated applications corresponding to the network service managed by the network computer system 100. In many examples, service requester devices 110 and service provider devices 120 can comprise mobile computing devices, such as smartphones, tablet computers, virtual reality or augmented reality headsets, on-board computing systems of vehicles, and the like. Example network services can comprise delivery of food or products, package mailing, shopping, construction, plumbing, home repair, housing or apartment sharing, etc., or can include transportation arrangement services. In an example using transport arrangement services, the service requesters are prospective passengers to be picked up and transported, and the service providers are drivers who transport the service requesters.

According to examples, service interfaces on the request processing server 130 enable the network computer system 100 to exchange data with the service requester devices 110 and the service provider devices 120 over the network 150. For example, the service interfaces can use one or more network resources to exchange communications over one or more wireless networks (e.g., a cellular transceiver, a WLAN transceiver, etc.). The service interfaces can include or implement an externally-facing application programming interface (API) to communicate data with the service requester devices 110 and the service provider devices 120. The externally-facing API can provide access to the request processing server 130 via secure channels over the network 150 through any number of methods, including web-based forms, programmatic access via restful APIs, Simple Object Access Protocol (SOAP), remote procedure call (RPC), scripting access, etc.

In some examples, the location selector 132 stores data for predefined service areas and service locations in one or more database systems, such as location datastore 142. The provider selector 134 can store provider data, including provider profiles and current status information, in one or more database systems, such as provider datastore 144.

Figure 2:
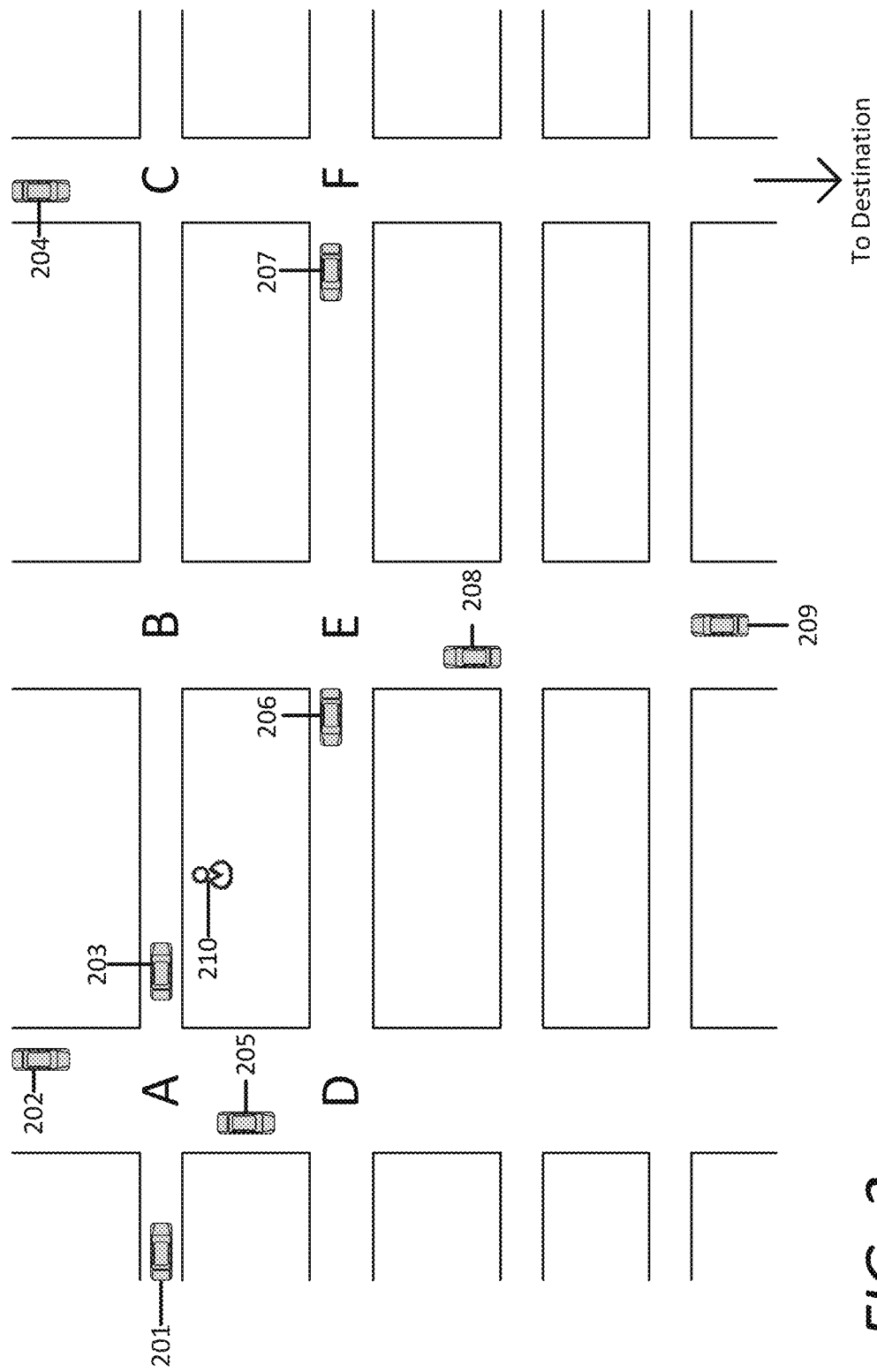
FIG. 2 is a block diagram illustrating an example map scenario, in accordance with examples described herein.

FIG. 2 is a block diagram illustrating an example map scenario, in accordance with examples described herein. In some situations, it is more efficient for the request processing server 130 to select a location near a user's current position to designate as a pickup location for an on-demand transportation service, rather than having the user 210 manually choose the pickup location. The request processing server 130 receives any destination information and the current position of the user 210 and retrieves data corresponding to nearby drivers 201-209, prior to the user 210 submitting a service request to the network computer system 100. Based on the positions, speed, and headings of the drivers 201-209, the location selector 132 can determine likely availability of each driver at a number of predefined service areas near the position of the user 210 (e.g., intersections A-F). The location selector 132 scores each intersection for each driver and aggregates the driver scores to select one of the predefined service areas as an optimal area to use as a pickup location once the user 210 submits a service request.

According to some examples, the user 210 can indicate to the network computer system 100 that the user 210 is willing to travel to an area that a location selector 132 suggests as a good pickup location. The user 210 may indicate specific preferences (e.g., a willingness to walk a maximum distance, such as two city blocks or willingness to incur more expense by having a shorter walking distance to the user's destination), by opting in or agreeing to an option via a user interface of the service requester application. In the example of FIG. 2, intersections A-F represent the predefined service areas within the specific preferences (e.g., maximum walking distance) the user 210 set.

In one aspect, the request processing server 130 can select the pickup location based on a best match location or best match driver. However, if the user 210 delays making a request for service, even if only for ten seconds, the selected best match may no longer be the optimal choice once the user 210 makes the request. For example, a driver may be traveling quickly or in the opposite direction from the user 210, thus making that driver a poor match for the user 210 after ten seconds. In high traffic cities with one-way streets and avenues, it can take a driver a significant amount of time to loop back around to a pickup location that the driver has already passed. This can result in user cancellations, driver cancellations, low efficiency, and overall poor service.

Therefore, rather than selecting the service location based on a current best match provider or location, the location selector 132 can select a service location or area where the user 210 has the highest probability of matching with a service provider at a future time (i.e., a time when the user 210 is predicted to submit a service request to the network computer system 100). That is, of intersections A-F, which intersection should the user 210 walk towards to get a ride to the destination.

In the example of FIG. 2, the user 210 opens a service application that communicates the position of the user 210 to the network computer system 100. The user 210 can input a destination through the user interface of the service application. Based on factors such as the position of the user 210, the destination, and current supply provisioning of drivers 201-209, the location selector 132 can determine which of the nearby intersections A-F to designate as the service area for a service request that the user 210 may submit to the network computer system 100.

In some aspects, the location selector 132 can determine which of the intersections A-F to select as the service area based on base scores and aggregate probabilities for the availability of each of the drivers 201-209 at each of the intersections. The location selector 132 can base the probability of a driver being available at an intersection on the travel speed for the driver, distance of the driver to the intersection, a directional heading of the driver, the destination specified by the user 210, a deviation between the directional heading for the driver and a heading towards the destination, a number of people in the driver's vehicle (i.e., other passengers in a ride-pooling service), a prediction that the driver receives another service request before the user 210 requests service, historical or real-time traffic conditions around the service area, distance the driver must backtrack to get to the service area, historical availability data for a region around the intersection, among other factors associated with the driver, service area, and user.

In the example illustrated, intersection A is the closest of the predefined service areas to the position of the user 210. In addition, four vehicles belonging to drivers 201, 202, 203, and 205 are near intersection A. However, since the user 210 has not yet submitted a service request and may not do so for another fifteen seconds, the location selector 132 takes into account the probabilities that each of those drivers may be available at intersection A in fifteen seconds.

In this example, drivers 203 and 205 have already passed intersection A and can therefore be assigned very low probabilities of being available at intersection A. Drivers 201 and 202 are approaching intersection A, and may or may not be available depending on their speed, distance, and traffic conditions (including traffic signals, stop signs, etc.). For example, if driver 201 has just stopped at a red light and intends to go straight, the driver has a high probability of being available at intersection A in fifteen seconds. On the other hand, if driver 202 has a green light and is traveling at 30 miles per hour, then driver 202 has a low probability of being available at intersection A in fifteen seconds. Based on their combined probabilities, the location selector 132 can calculate a probability score for intersection A that represents the overall probability of at least one of the drivers 201-209 being available at intersection A in fifteen seconds.

In some aspects, the location selector 132 can determine the probability of a driver being available at an intersection based on a directional heading of the driver, the destination specified by the user 210, and a deviation between the directional heading for the driver and a heading towards the destination. For example, when considering the availability of driver 202, the location selector 132 can assign a higher probability of driver 202 going straight to intersection D than turning towards intersection B. In another example, when considering the availability of drivers 208 and 209, the location selector 132 can assign them a lower probability of being available to take user 210 to the destination because the drivers' headings are in the opposite direction from the destination. Driver 204, on the other hand, is heading straight towards the destination and therefore may be assigned a higher probability of being available (e.g., at intersections C and F).

In some aspects, the location selector 132 can determine the probability of a driver being available at an intersection based on a number of people in the driver's vehicle (i.e., other passengers in a ride-pooling service). For example, if the driver has a passenger in the vehicle, there is an increased probability that the driver continues on the current heading. Additional passengers can increase this probability because of a higher likelihood that the passengers' destinations are closer together and located in the same general direction as the current heading. Therefore, for each additional passenger in a vehicle, the location selector 132 can assign higher probabilities to the driver of being available for the user 210 at an intersection.

In further aspects, the location selector 132 can determine the probability of a driver being available at an intersection based on a prediction that the driver receives another service request before the user 210 requests service. The location selector 132 can retrieve supply provisioning information such as the number of local drivers, service requesters, average idle times, etc. to determine the probability that a given driver may receive and accept a service request from a different prospective passenger prior to the user 210 submitting a service request.

In further aspects, the location selector 132 can determine the probability of a driver being available at an intersection based on historical availability data for an area around the intersection. Certain areas are poorly suited for picking up passengers due to high traffic, crowds, street layouts, etc. (e.g., popular tourist spots or subway stations). The location selector 132 can take advantage of historically-compiled map and pickup data identifying which areas of a city are more challenging for drivers to pick up passengers. In one example, the map data divides the city into grids and assigns probability weights to each of the grid points based on the difficulty of using a pickup location in that area.

In one aspect, the location selector 132 selects the intersection with the highest probability score. In other aspects, the location selector 132 calculates or receives a base score that indicates the quality of a match between the driver and the user. The location selector 132 can then modify the base score for each driver by their respective probability score to obtain a net score. In one aspect, the net score is the product of the base score and probability score. The location selector 132 can use the net scores, rather than the base scores or probability scores alone, to select the intersection for the user. In one example, the location selector 132 selects the intersection corresponding to the highest individual net score among the drivers.

Once the intersection is selected, the location selector 132 transmits, to the computing device of the user 210, data corresponding to the selected intersection. Upon making a request for service, the user's computing device can display directions to the intersection while the provider selector 134 identifies a driver to pick up the user 210 at the intersection. In addition to identifying a driver, components of the request processing server 130 can select a specific corner or side of the road near the intersection to use as the pickup location. In one example, the request processing server 130 selects a corner of the intersection on the driver's right side after the intersection's traffic signal. In another example, the request processing server 130 prefers wider roads for pickup locations and may therefore select a pickup location along an avenue instead of a side street.

Figure 3:
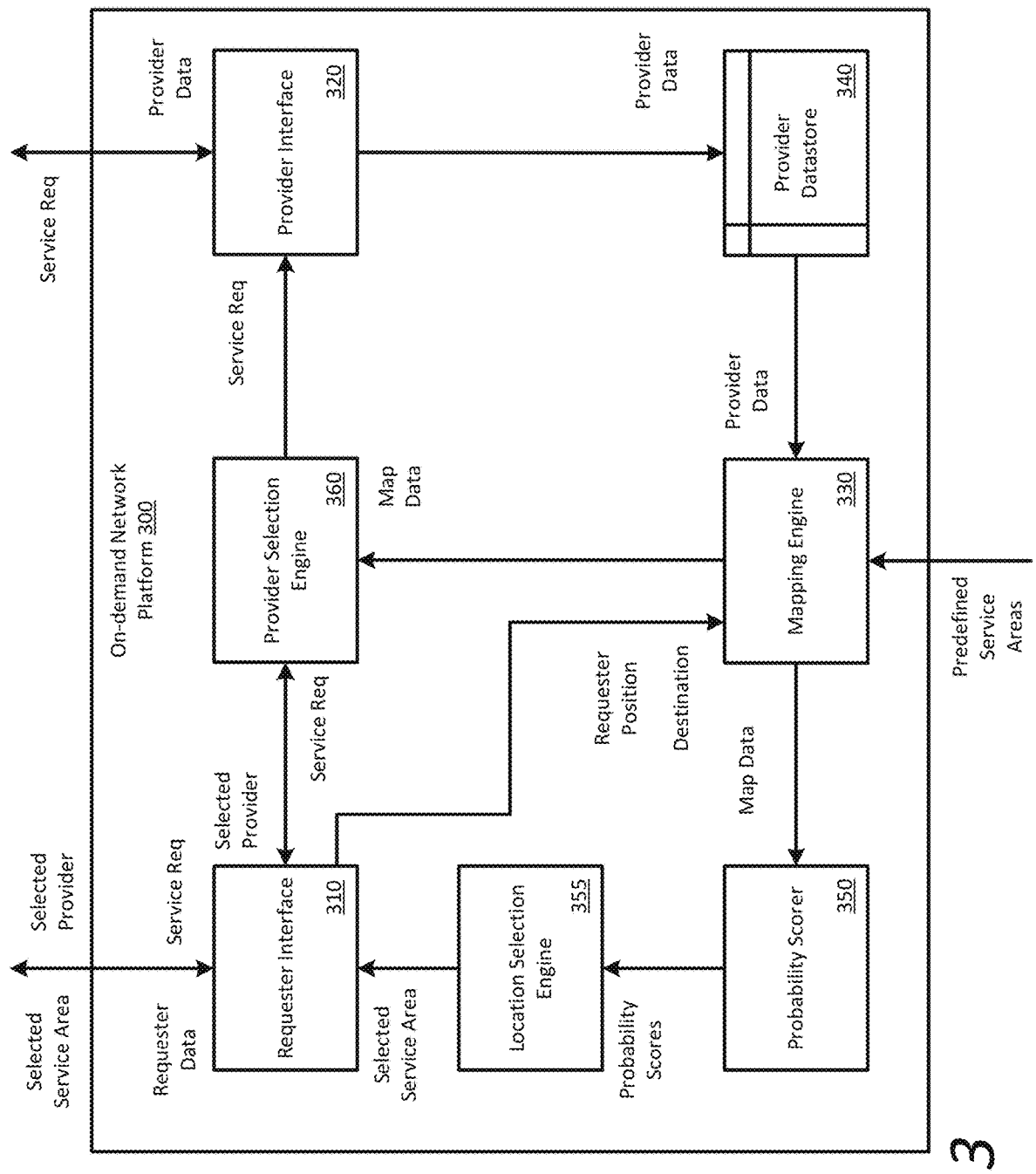
FIG. 3 is a block diagram illustrating an example on-demand network service with predictive location selection, in accordance with examples described herein.

FIG. 3 is a block diagram illustrating an example on-demand network service with predictive location selection, in accordance with examples described herein. The on-demand network platform 300 can include a provider interface 320 to communicate over one or more networks with a service provider application running on a service provider device. According to examples, service providers register with the on-demand network platform 300 to receive service invitations through the service provider application to fulfill service requests submitted by the service requesters. In an example using transport services, the service requesters are prospective passengers to be picked up and transported, and the service providers are drivers who transport the service requesters.

Service providers can select various states or modes within the service provider application, such as an online state that indicates the service provider is available and willing to fulfill service invitations and a type of service offered, such as a single user transportation service or a pool transportation service where a driver transports multiple users to their destinations simultaneously.

In accordance with various examples, the service provider device transmits provider data over the network to the provider interface 320. The provider data includes information such as the provider mode and service state, the current location of the service provider, the heading of the service provider, a number of people in a vehicle with the provider, etc. In some implementations, the service provider devices can determine the current location of the service provider using location-based resources of the service provider devices (e.g., global positioning system (GPS) resources). The service provider application can continually update the provider status on a regular schedule or in response to provider input to the service provider device, location changes determined by GPS, service steps performed, etc. The provider interface 320 stores the provider data in a provider datastore 340 (e.g., a database or data structure) accessible by other components of the on-demand network platform 300 that select service areas and service providers to fulfill the service requests.

The on-demand network platform 300 can include a service requester interface 310 to communicate with service requester devices over one or more networks via a service requester application. In some aspects, while the service requester application is running on a service requester device for a user, the application transmits requester data, including the current position of the device, to the requester interface 310. The service requester application can enable the service requester to select from various service types, such as ride-sharing services that match the requester with a provider who transports the requester to a destination.

In response to a selection of a particular service type and a destination, the on-demand network platform 300 can select a service area (i.e., a place where a driver can pick up the user in a vehicle), prior to receiving a service request from a user. The selection of the service area can be based on the position of the user, the destination, and proximate available service providers. In another aspect, the on-demand network platform 300 can select the service area in response to receiving the position of the user or the selection of service type without a destination.

The on-demand network platform 300 can provide estimated time to arrival (ETA) data on a user interface of the service requester application that indicates the shortest ETA of nearby service providers for the service type and/or the locations of nearby service providers for that service type. As the service requester scrolls through each service type, the user interface can update to show visual representations of the service providers for that service type on a map centered on the service requester. The service requester can interact with the user interface of the service requester application to select a particular service type, input a destination, and transmit a service request.

In some examples, the on-demand network platform 300 can include a mapping engine 330 to generate map data, including traffic data, in the environment surrounding the requester position and/or destination. The mapping engine 330 can also retrieve service provider locations, status, and availability from the provider datastore 340 or a provider tracking component and include the provider locations for available providers with the map data. In some implementations, the functionality of the mapping engine 330 is provided on a separate server that the on-demand network platform 300 accesses, which may be part of the network computer system 100 or a third-party mapping service.

The map data can also include predefined service areas that are within a threshold distance or travel time from the requester position. In one example, the predefined service areas encompass sets of corners at road intersections. In other examples, the predefined service areas can include popular service locations, such as landmarks and other attractions. The predefined service areas can be identified or updated from mapping data, manually submitted data from users, and driving data automatically collected by autonomous vehicles or other devices.

In some aspects, a probability scorer 350 uses the map data to determine probability scores for each of the predefined service areas. The probability scorer 350 can determine the probability score for a predefined service area based on the predicted availability of each of the nearby providers. Determining the predicted availability of a given provider within a given predefined service area is based on an aggregate of factors. Among others, these factors can include travel speed for the given provider, distance of the given provider to the given predefined service area, a directional heading of the given provider, a service destination specified by the requester, a deviation between the directional heading for the given provider and a heading towards the destination, number of people in a vehicle driven by the given provider, a prediction that the given provider receives another service request before the requester submits a request for service, and historical availability data for the given predefined service area.

In some aspects, the probability scorer 350 can determine the probability of a provider being available at a service area based on the travel speed for the given provider and the distance of the given provider to the given predefined service area. For example, if the provider is 200 feet from the service area and traveling at 40 feet per second, the probability scorer 350 can determine that the provider is likely to pass the service area before the requester submits a service request in an expected default timeframe (e.g., fifteen seconds). In addition to travel speed and distance, the probability scorer 350 can also consider traffic conditions, including traffic signals, stop signs, etc.

In some aspects, the probability scorer 350 can determine the probability of a provider being available at a service area based on a directional heading of the provider, the destination specified by the requester, and a deviation between the directional heading for the provider and a heading towards the destination.

In some aspects, the probability scorer 350 can determine the probability of a provider being available at a service area based on a number of people in the provider's vehicle (i.e., other passengers in a ride-pooling service). For example, if the provider has a passenger in the vehicle, there is an increased probability that the provider continues on the current heading. Additional passengers can increase this probability because of a higher likelihood that the passengers' destinations are closer together and located in the same general direction as the current heading. Therefore, for each additional passenger in a vehicle, the probability scorer 350 can assign higher probabilities to the provider of being available for the requester at a service area.

In further aspects, the probability scorer 350 can determine the probability of a provider being available at a service area based on a prediction that the provider receives another service request before the requester submits a service request. The probability scorer 350 can retrieve supply provisioning information such as the number of local providers, service requesters, average idle times, etc. to determine the probability that a given provider may receive and accept a service request from a different prospective passenger prior to the requester submitting a service request.

In further aspects, the probability scorer 350 can determine the probability of a provider being available at a service area based on historical availability data around the service area. Certain areas are poorly suited for picking up passengers due to high traffic, crowds, street layouts, etc. (e.g., popular tourist spots or subway stations). The probability scorer 350 can take advantage of historically-compiled map data identifying which areas of a city are more challenging for providers to pick up passengers. In one example, the map data divides the city into grids and assigns probability weights to each of the grid points based on the difficulty of using a pickup location in that area.

In one implementation, the probability scores represent independent likelihoods of at least one service provider being available to provide service to the requester at a service area. For example, a requester may have a 75% chance of getting service within a threshold period of time at a first service area, and a 90% chance at a second service area. In another implementation, the probability score for a given service area represents the likelihood that, in response to a future service request (e.g., one made fifteen seconds after the service area is selected and transmitted to the requester), the optimal location to fulfill the future service request is within the given service area.

In some aspects, the probability scorer 350 can compute multiple types of probabilities in addition to, or instead of, the probability of a requester receiving service at a given service area. Additional types can include the probability of a given service area yielding an optimal service provider in terms of minimizing or maximizing wait times, travel times, costs, or convenience to the requester, service provider, or the on-demand network platform 300.

In one aspect, a location selection engine 355 selects the service area with the highest probability score. In other aspects, the location selection engine 355 calculates or receives a base score that indicates the quality of a match between the driver and the user. The location selection engine 355 can then modify the base score for each service provider by their respective probability score to obtain a net score. In one aspect, the net score is the product of the base score and probability score. The location selection engine 355 can use the net scores, rather than the base scores or probability scores alone, to select the service area for the user. In one example, the location selection engine 355 selects the service area corresponding to the highest individual net score among the service providers.

Once the service area is selected, the requester interface 310 transmits data corresponding to the selected service area to the service requester device. Upon making a request for service, the service requester device can display directions to the selected service area while the provider selection engine 360 identifies a provider to rendezvous with the requester in the service area to fulfill the service request at that time.

Once the provider selection engine 360 selects a service provider and a more specific service location within the selected service area, the provider interface 320 can transmit the service request data to the selected service provider's device. In addition to the service location, the provider interface 320 can transmit requester information, such as a name and photograph of the service requester. Upon receiving the service invitation, the service provider can either accept or reject the invitation. Rejection of the invitation can cause the provider selection engine 360 to choose another service provider from a candidate set of service providers to fulfill the service request. However, if the service provider accepts (e.g., via an acceptance input), then the acceptance input is transmitted back to the on-demand network platform 300, which generates and transmits a confirmation of the service provider and the service location to the service requester.

In one aspect, if the requester submits a service request before the location selection engine 355 has selected a service area, the mapping engine 330, probability scorer 350, and location selection engine 355 can continue the process of selecting a service area and transmitting walking directions to the service area to the requester. The provider selection engine 360 can wait until the service area is selected, or in an alternative, select a service provider concurrently with the location selection engine determining the service area.

In one example, the requester submits the service request after the service area is selected, but the provider selection engine 360 determines that an optimal provider and/or service location is outside of the service area. In this example, the on-demand network platform 300 honors the selected service area if it has been displayed to the requester. As a result, the provider selection engine 360 selects a provider to fulfill the service request within the selected service area even if other options are available.

In some aspects, the location selector 132 of FIG. 1 comprises a combination of components of the on-demand network platform 300, including the probability scorer 350, the location selection engine 355, and the mapping engine 330. Furthermore, the provider selector 134 of FIG. 1 can comprise a combination of components including the mapping engine 330 and the provider selection engine 360

Methodology

Figure 4:
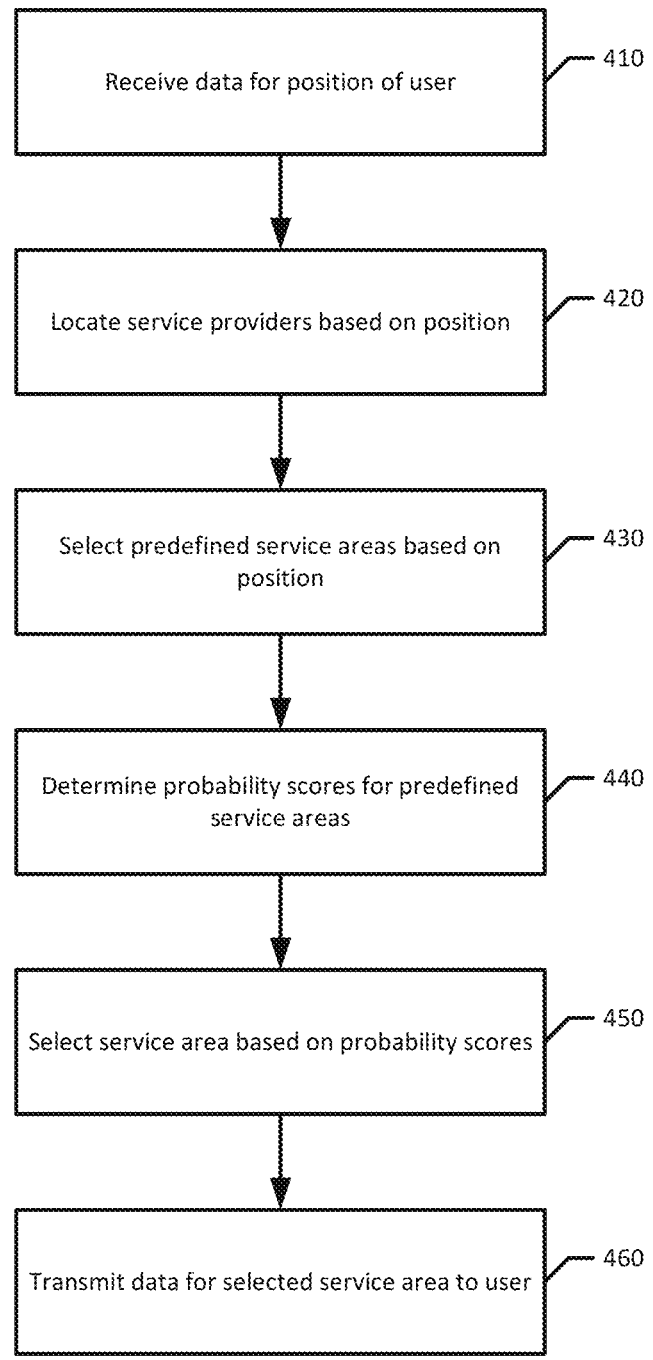
FIG. 4 is a flow chart describing an example method of operating a network computer system with predictive location selection, according to examples described herein.
Figure 5:
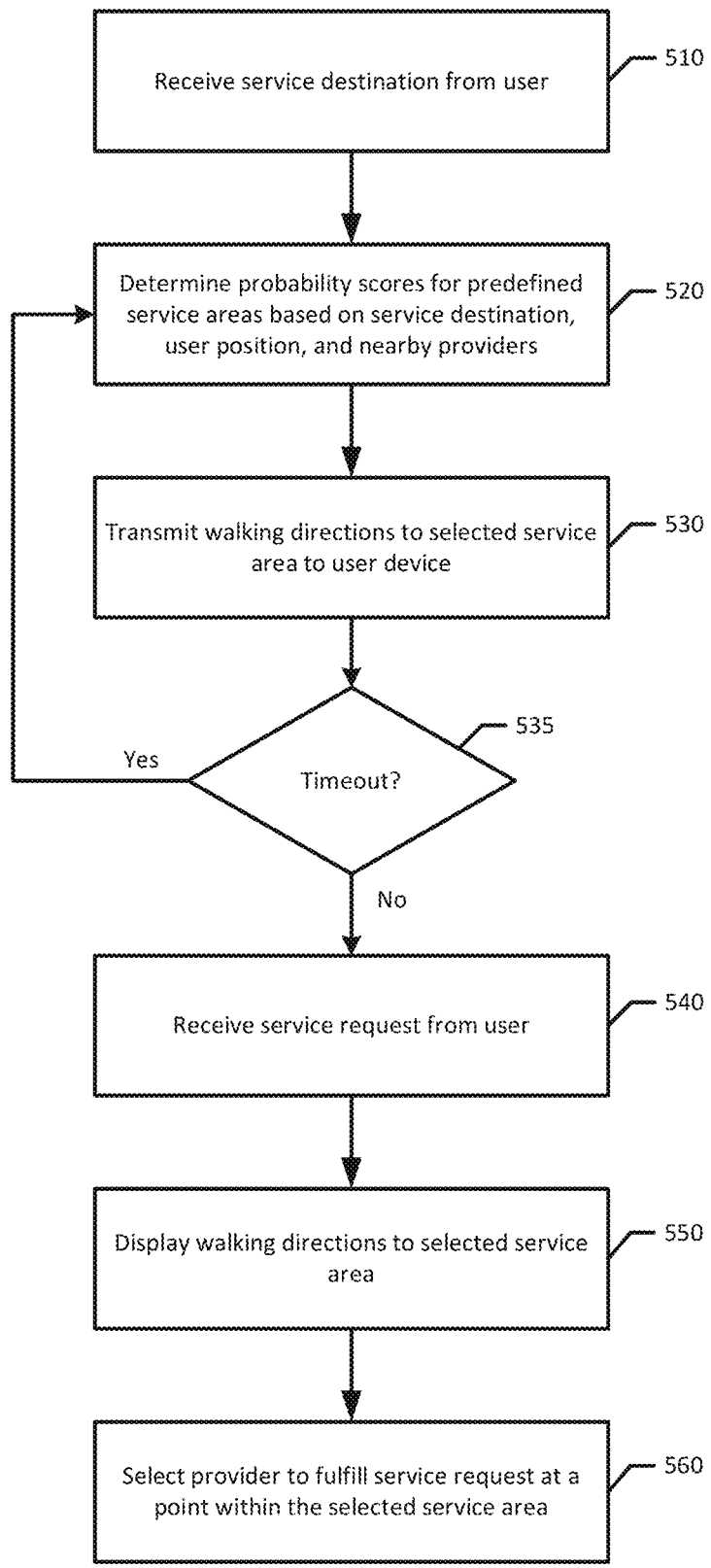
FIG. 5 is a flow chart describing an example method of predictive location selection, according to examples described herein.

FIGS. 4 and 5 are flow charts describing example methods used in predicting optimal service locations and providing the service locations to service requesters. Although some operations of the methods are described below as being performed by specific components of the computer systems illustrated in FIGS. 1 and 3, it will be appreciated that these operations need not necessarily be performed by the specific components identified, and could be performed by a variety of components and modules, potentially distributed over a number of machines. Accordingly, references may be made to elements of the request processing server 130 for the purpose of illustrating suitable components or elements for performing a step or sub-step being described. Alternatively, at least certain ones of the variety of components and modules described as part of the on-demand network platform 300 can be arranged within a single hardware, software, or firmware component. It will also be appreciated that some of the steps of these methods may be performed in parallel or in a different order than illustrated.

FIG. 4 is a flow chart describing an example method of operating a network computer system with predictive location selection, according to examples described herein. In some aspects, the network computer system can preselect a service location, prior to receiving a service request from a user, based on the position of the user and proximate available service providers. In one aspect, in response to the user inputting a destination for a transportation service, the network computer system determines the specific service location or a more general service area (e.g., an intersection of roads), which may be where the user has the highest probability of matching with a service provider upon submitting a service request to the network computer system.

According to some examples, the network computer system receives data corresponding to the position of the user from a service requester application running on a computing device of the user (410). The computing device can determine the position of the user through location-based resources of the device (e.g., a global positioning system (GPS) unit). The position of the user can be in the form of latitude and longitude coordinates, street address, or any format that enables the network computer system to calculate distances and provide directions from the user to other locations. The service requester application can continually update the position of the user on a regular schedule or in response to user input, location changes determined by GPS, service steps performed, etc.

In response to receiving the data corresponding to the position of the user, the network computer system locates service providers based on the position of the user (e.g., service providers within a threshold distance or travel time from the position of the user) (420). In one implementation, the network computer system locates the service providers in response to receiving a destination for a transportation service from the user.

The network computer system selects predefined service areas, such as sets of corners at intersections, within a threshold distance or travel time from the position of the user (430). In some examples, the network computer system can identify a region associated with the position of the user by comparing the position of the user to the geographical area and/or to other data associated with the regions. Predefined service areas for the region are retrieved from a location datastore, database, memory, or data structure. Depending on user settings or system defaults, the network computer system can filter the predefined service areas to ones that are within a default or user-defined threshold walking distance, such as two city blocks, from the position of the user.

In some aspects, the network computer system determines a probability score for at least some of the predefined service areas based on predicted availability of the service providers to provide service to the user (440). The predicted availability is determined based on a time when the user is expected to request service. In some examples, this time is predetermined, such as fifteen seconds from the current time. In other examples, the network computer system can predict when the user is expected to request service, which can be based on historical data for the user and other users.

Determining the predicted availability of a given provider within a given predefined service area is based on an aggregate of factors. Among others, these factors can include travel speed for the given provider, distance of the given provider to the given predefined service area, a directional heading of the given provider, a service destination specified by the user, a deviation between the directional heading for the given provider and a heading towards the service destination, number of people in a vehicle driven by the given provider, a prediction that the given provider receives another service request before the user requests service, and historical availability data for the given predefined service area.

In some aspects, the network computer system selects one of the predefined service areas based on the probability scores (450). In one example, the network computer system selects the predefined service area with the highest probability score, which represents the area where the user is more likely to successfully receive service from a service provider, in comparison to the other predefined service areas.

Once the service area is selected, the network computer system transmits, to the computing device of the user, data corresponding to the selected service area (460). The data can include a map location for the selected service area and walking directions from the position of the user to the selected service area. Therefore, once the user makes a request for service with the computing device, the device can display the map location and walking directions to the selected service area without waiting to receive confirmation of a service provider.

FIG. 5 is a flow chart describing an example method of predictive location selection, according to examples described herein. Rather than requiring a user to manually choose a location to receive a service (e.g., a pickup location for a ride-sharing service), a network computer system can determine the location, or service area, where the user has the highest probability of matching with a service provider upon submitting a service request to the network computer system.

In some examples, the network computer system receives data corresponding to the position of the user and a service destination for a transportation service from an application running on a computing device of the user (510). In response to receiving the destination, the network computer system locates service providers and predefined service areas based on the position of the user (e.g., service providers and areas within a threshold distance or travel time from the position of the user) and the destination.

For each of the nearby providers, the network computer system determines a probability of the provider being available at each of the predefined service areas at a time when the user is expected to request service. The network computer system can base the probability of a provider being available at a service area on a number of factors including the travel speed for the provider, distance of the provider to the service area, a directional heading of the provider, the destination specified by the user, a deviation between the directional heading for the provider and a heading towards the destination, a number of people in the provider's vehicle (i.e., other passengers in a ride-pooling service), a prediction that the provider receives another service request before the user requests service, and historical availability data for a region around the service area.

In one aspect, each of the factors represents a rule that the network computer system uses to determine whether the provider is available at a service area. If the provider data for a given provider meets each of the rules within a threshold tolerance for a given service area, that provider is deemed available at that service area. In other aspects, the network computer system can use a weighted ranking method to assign probabilities for each provider at each service area.

In one example, once the network computer system has determined probabilities for each of the nearby providers, the network computer system can aggregate the provider probabilities to calculate a probability score for each of the predefined service areas. Consequently, service areas with more nearby providers who have higher probabilities of being available at that service area have a higher probability score than service areas with fewer, less likely providers.

In one implementation, the probability scores represent independent likelihoods of at least one service provider being available to provide service to the user at a service area. For example, a user may have a 75% chance of getting service within a threshold period of time at a first service area, and a 90% chance at a second service area. In another implementation, the probability score for a given service area represents the likelihood that, in response to a future service request (e.g., one made fifteen seconds after the service area is selected and transmitted to the user), the optimal location to fulfill the future service request is within the given service area. In both implementations, the network computer system can select the service area with the highest probability score.

In another example, the network computer system calculates a base score for each of the service providers that indicates the quality of a match between the service provider and the user. The network computer system can then modify the base score for each provider by their respective probability score to obtain a net score. In one aspect, the net score is the product of the base score and probability score. The network computer system can use the net scores, rather than the base scores or probability scores alone, to select the service area for the user. In one example, the network computer system selects the service area corresponding to the highest individual net score among the service providers.

Once the service area is selected, the network computer system transmits, to the computing device of the user, data corresponding to the selected service area (530). The data can include a map location for the selected service area and walking directions from the position of the user to the selected service area. Therefore, once the user makes a request for service with the computing device, the device can display the map location and walking directions to the selected service area without waiting to receive confirmation of a service provider.

However, if the user does not submit a service request within a threshold period of time (e.g., 30 seconds), the user's computing device can request an updated service area from the network computer system, thereby preventing the preselected service area from going stale (535). If the programmed period of time passes, the user's computing device can provide the network computer system with the location of the user and any selected destination and request an updated service area. The network computer system finds predefined service areas near the location of the user, recalculates probability scores for each of the service areas, and transmits updated walking directions to one of the service areas selected based on the probability scores.

If the user submits a request for service (540) before the threshold period of time expires, the user's computing device can display the walking directions to the selected service area (550). As the user walks towards the selected service area, components of the network computer system perform a provider selection process to identify a service provider to fulfill the service request at a point, or service location, within the selected service area (560). For example, if the service area is a road intersection in a city, the service location can be one of the corners of the intersection or a point along the road after the intersection. Once the network computer system selects and receives confirmation from a service provider, the network computer system transmits the service location and service provider data to be displayed on the user's computing device. The user's computing device can update the walking directions to guide the user to the service location, and the device can also display data including an estimated time to arrival for the service provider, a picture of the provider, license plate number, rating, etc.

Service Requester Device

Figure 6:
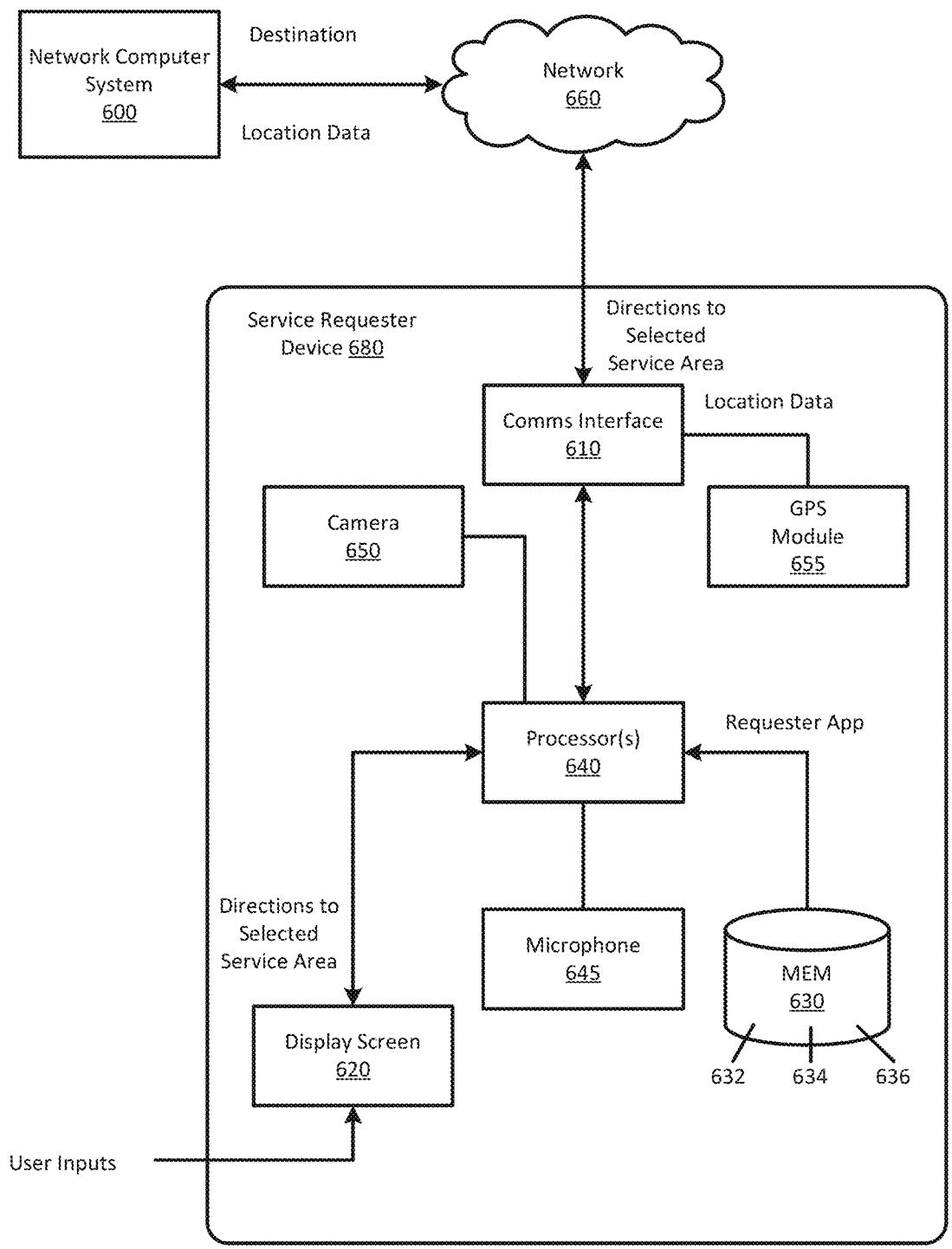
FIG. 6 is a block diagram illustrating an example service requester device executing a service requester application for an on-demand service, as described herein.

FIG. 6 is a block diagram illustrating an example service requester device executing a designated service requester application for an on-demand service, as described herein. In many implementations, the service requester device 680 can comprise a mobile computing device, such as a smartphone, tablet computer, laptop computer, VR or AR headset device, and the like. As such, the service requester device 680 can include typical telephony features such as a microphone 645, a camera 650, and a communication interface 610 to communicate with external entities using any number of wireless communication protocols. In certain aspects, the service requester device 680 can store a designated application (e.g., a service requester application 632) in a local memory 630. In many aspects, the service requester device 680 further stores information corresponding to a contacts list 634 and calendar appointments 636 in the local memory 630. In variations, the memory 630 can store additional applications executable by one or more processors 640 of the service requester device 680, enabling access and interaction with one or more host servers over one or more networks 660.

In response to user input, a processor 640 can execute the service requester application 632, which can cause an application interface to be generated on a display screen 620 of the service requester device 680. The application interface can enable the service requester to, for example, check current price levels and availability for the on-demand arrangement service. In various implementations, the application interface can further enable the service requester to select from multiple ride service types, such as a carpooling service type, a regular ride-sharing service type, a professional ride service type, a van on-demand service type, a luxurious ride service type, and the like. In addition, the application interface can enable the service requester to input a desired destination for the type of service selected.

As provided herein, the service requester application 632 can further enable a communication link with a network computer system 600 over the network 660, such as the network computer system 100 as shown and described with respect to FIG. 1. Furthermore, as discussed herein, the service requester application 632 can display walking directions to a service area selected by the network computer system 600 on the application interface. In addition, the application interface can display information regarding a selected service provider and any service request, including a service location, estimated time to arrival or destination, a picture of the service provider, license plate number, rating, vehicle type, and the like.

In various examples, the service requester device 680 can further include a GPS module 655, which can provide location data indicating the current location of the requester to the network computer system 600 so that the system can select an appropriate service area and service requester to fulfill user service requests.

In alternative aspects, hard-wired circuitry may be used in place of, or in combination with, software instructions to implement aspects described herein. Thus, aspects described are not limited to any specific combination of hardware circuitry and software configuration.

Hardware Diagram

Figure 7:
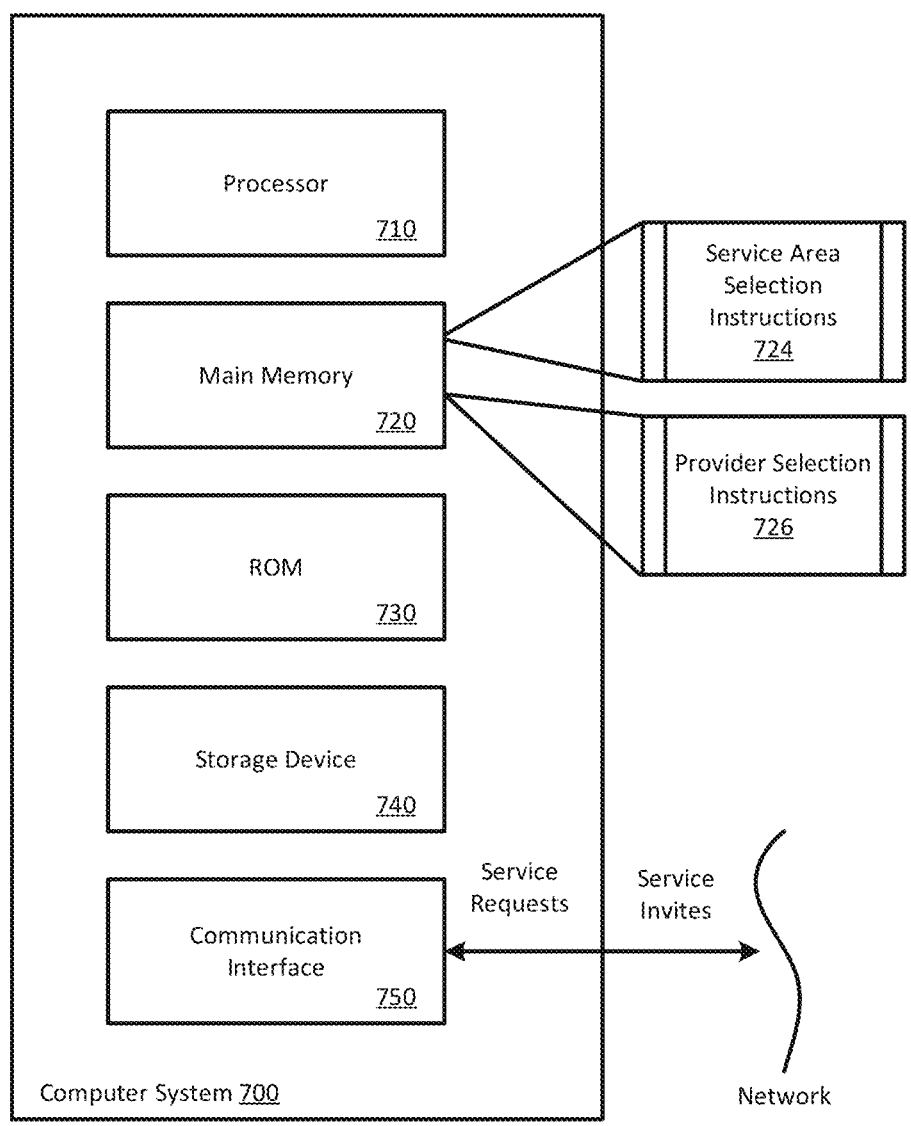
FIG. 7 is a block diagram that illustrates a computer system upon which aspects described herein may be implemented.

FIG. 7 is a block diagram that illustrates a computer system upon which examples described herein may be implemented. A computer system 700 can represent, for example, hardware for a server or combination of servers that may be implemented as part of a network service for providing on-demand services. In the context of FIG. 1, the network computer system 100 may be implemented using a computer system 700 or combination of multiple computer systems 700 as described by FIG. 7.

In one aspect, the computer system 700 includes processing resources (processor 710), a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks (e.g., a cellular network) through use of a network link (wireless or wired). Using the network link, the computer system 700 can communicate with one or more computing devices, one or more servers, and/or one or more self-driving vehicles. In accordance with some examples, the computer system 700 receives service requests from mobile computing devices of individual users. The executable instructions stored in the memory 730 can include service area selection instructions 724 and provider selection instructions 726 to perform one or more of the methods described herein when executed.

By way of example, the instructions and data stored in the memory 720 can be executed by the processor 710 to implement an example request processing server 130 of FIG. 1. In performing the operations, the processor 710 can handle service requests and provider statuses and submit service invitations to facilitate fulfilling the service requests. The processor 710 executes instructions for the software and/or other logic to perform one or more processes, steps and other functions described with implementations, such as described by FIGS. 1 through 6.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A network computer system implementing a transport service, comprising:
one or more processors; and
a memory storing instructions that, when executed by the one or more processors, cause the network computer system to:
receive, over one or more networks, location data from a computing device of a requesting user, the location data indicating a current position of the requesting user;
prior to the requesting user transmitting a service request to the network computer system:
determine a plurality of transport providers within a predetermined distance or time from the current position of the requesting user;
repeatedly determine, based at least in part on location data corresponding to directional headings of the plurality of transport providers in relation to the current position of the requesting user, an optimal rendezvous location for the requesting user; and
for each repeatedly determined optimal rendezvous location, transmit, over the one or more networks, map data corresponding to the optimal rendezvous location to the computing device of the requesting user, the map data causing the computing device of the requesting user to display a map interface presenting the optimal rendezvous location on a map; and upon receiving the service request from the computing device of the requesting user, (i) select a transport provider from the plurality of transport providers to rendezvous with the requesting user at a current optimal rendezvous location of the repeatedly determined optimal rendezvous locations, and (ii) transmit travel data to the computing device of the requesting user, the travel data causing the map interface to present travel directions from the current position of the requesting user to the current optimal rendezvous location.

2. The network computer system of claim 1, wherein the executed instructions cause the network computer system to repeatedly determine the optimal rendezvous location by generating a plurality of probability scores for a plurality of possible rendezvous locations based at least in part on the directional headings of the plurality of proximate transport providers in relation to the current position of the requesting user, and wherein the optimal rendezvous location has a highest probability score of the plurality of probability scores.

3. The network computer system of claim 1, wherein the executed instructions cause the network computer system to transmit the map data corresponding to the optimal rendezvous location to the computing device of the requesting user prior to receiving the service request.

4. The network computer system of claim 1, wherein the executed instructions cause the network computer system to repeatedly determine the optimal rendezvous location for the requesting user in order to prevent the optimal rendezvous location from going stale.

5. The network computer system of claim 1, wherein the executed instructions cause the network computer system to repeatedly determine the optimal rendezvous location for the requesting user to account for inherent delays in a matching process in which the requesting user is matched with the selected transport provider subsequent to receiving the service request.

6. A non-transitory computer-readable medium storing instructions that, when executed by one or more processors of a network computer system, cause the network computer system to:
  receive, over one or more networks, location data from a computing device of a requesting user, the location data indicating a current position of the requesting user;
  prior to the requesting user transmitting a service request to the network computer system:
    determine a plurality of transport providers within a predetermined distance or time from the current position of the requesting user;
    repeatedly determine, based at least in part on location data corresponding to directional headings of a plurality of transport providers in relation to the current position of the requesting user, an optimal rendezvous location for the requesting user; and
    for each repeatedly determined optimal rendezvous location, transmit, over the one or more networks, map data corresponding to the optimal rendezvous location to the computing device of the requesting user, the map data causing the computing device of the requesting user to display a map interface presenting the optimal rendezvous location on a map; and
  upon receiving the service request from the computing device of the requesting user, (i) select a transport provider from the plurality of transport providers to rendezvous with the requesting user at a current optimal rendezvous location of the repeatedly determined optimal rendezvous locations, and (ii) transmit travel data to the computing device of the requesting user, the travel data causing the map interface to present travel directions from the current position of the requesting user to the current optimal rendezvous location.

7. The non-transitory computer-readable medium of claim 6, wherein the executed instructions cause the network computer system to repeatedly determine the optimal rendezvous location by generating a plurality of probability scores for a plurality of possible rendezvous locations based at least in part on the directional headings of the plurality of proximate transport providers in relation to the current position of the requesting user, and wherein the optimal rendezvous location has a highest probability score of the plurality of probability scores.

8. The non-transitory computer-readable medium of claim 6, wherein the executed instructions cause the network computer system to transmit the map data corresponding to the optimal rendezvous location to the computing device of the requesting user prior to receiving the service request.

9. The non-transitory computer-readable medium of claim 6, wherein the executed instructions cause the network computer system to repeatedly determine the optimal rendezvous location for the requesting user in order to prevent the optimal rendezvous location from going stale.

10. The non-transitory computer-readable medium of claim 6, wherein the executed instructions cause the network computer system to repeatedly determine the optimal rendezvous location for the requesting user to account for inherent delays in a matching process in which the requesting user is matched with the selected transport provider subsequent to receiving the service request.

11. A method of optimizing location selection, the method being performed by one or more processors and comprising:
  receiving, over one or more networks, location data from a computing device of a requesting user, the location data indicating a current position of the requesting user;
  prior to the requesting user transmitting a service request to the network computer system:
    determine a plurality of transport providers within a predetermined distance or time from the current position of the requesting user;
    repeatedly determining, based at least in part on location data corresponding to a directional heading of a proximate transport provider in relation to the current position of the requesting user, an optimal rendezvous location for the requesting user; and
    for each repeatedly determined optimal rendezvous location, transmitting, over the one or more networks, data corresponding to the optimal rendezvous location to the computing device of the requesting user, the map data causing the computing device of the requesting user to display a map interface presenting the optimal rendezvous location on a map; and
  upon receiving the service request from the computing device of the requesting user, (i) selecting a transport provider from the plurality of transport providers to rendezvous with the requesting user at a current optimal rendezvous location of the repeatedly determined optimal rendezvous locations, and (ii) transmitting travel data to the computing device of the requesting user, the travel data causing the map interface to present travel directions from the current position of the requesting user to the current optimal rendezvous location.

12. The method of claim 11, wherein the one or more processors repeatedly determine the optimal rendezvous location by generating a plurality of probability scores for a plurality of possible rendezvous locations based at least in part on the directional headings of the plurality of proximate transport providers in relation to the current position of the requesting user, and wherein the optimal rendezvous location has a highest probability score of the plurality of probability scores.

13. The method of claim 11, wherein the one or more processors transmit the map data corresponding to the optimal rendezvous location to the computing device of the requesting user prior to receiving the service request.

14. The method of claim 11, wherein the one or more processors repeatedly determine the optimal rendezvous location for the requesting user in order to prevent the optimal rendezvous location from going stale.

15. The method of claim 11, wherein the one or more processors repeatedly determine the optimal rendezvous location for the requesting user to account for inherent delays in a matching process in which the requesting user is matched with the selected transport provider subsequent to receiving the service request.

\* \* \* \* \*